Figure 1:
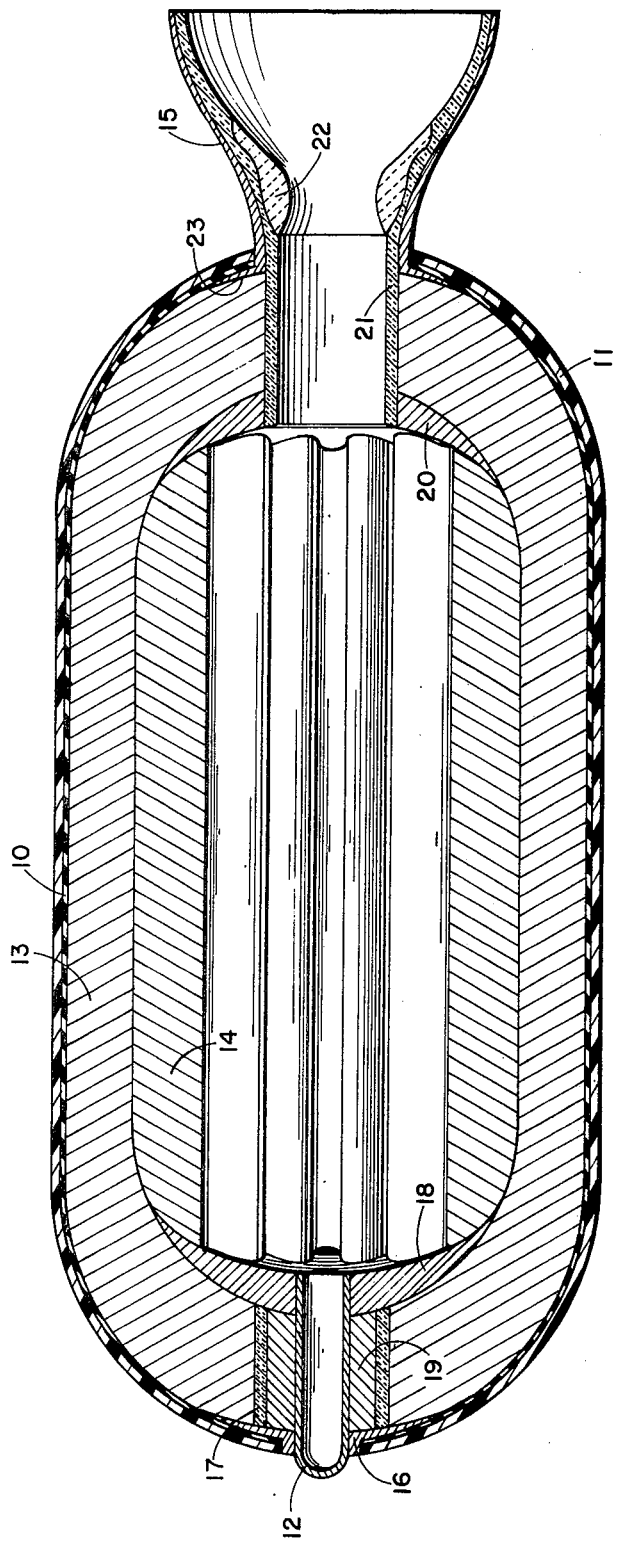

United States Patent [19]
Morse

[11] 3,811,358

[45] May 21, 1974

[54] SOLID PROPELLANTS CONTAINING REINFORCING FILAMENT AND PROCESS OF MAKING

[75] Inventor: Charles P. Morse, Pacific Palisades, Calif.

[73] Assignee: Rockwell International Corporation, El Segundo, Calif.

[22] Filed: Oct. 10, 1961

[21] Appl. No.: 144,265

[52] U.S. Cl.............. 86/20 R, 86/1 R, 102/101, 102/102, 149/2
[51] Int. Cl........................... C06d 5/06, F42b 1/00
[58] Field of Search........ 102/98, 101, 102; 149/19, 149/60, 2; 86/1, 20 R; 156/169, 171

[56] References Cited
UNITED STATES PATENTS

| | | | |
|---|---|---|---|
| 3,000,308 | 9/1961 | Land et al............................ | 149/19 |
| 3,022,735 | 2/1962 | Eberle................................ | 102/98 |
| 2,995,091 | 8/1961 | Haymes et al...................... | 102/98 |
| 2,986,092 | 5/1961 | Murphey............................ | 149/60 X |
| 3,035,950 | 5/1962 | Long.................................. | 149/89 X |

FOREIGN PATENTS OR APPLICATIONS 227,775 4/1960 Australia........................ 102/98 M

*Primary Examiner*—Benjamin R. Padgett
*Attorney, Agent, or Firm*—Robert M. Sperry

EXEMPLARY CLAIM

1. A propellant grain comprising a solid decomposable polymeric matrix and a reinforcing metal filament lattice supported in said matrix to improve the tensile strength thereof, said lattice comprising at least one continuous metal filament element wherein each filament primarily traverses a direction which is not parallel to any plane of symmetry in said matrix, said lattice selected from the class consisting of metals of Group II-A through Group IV-A, Group I-B through VII-B, and Group VIII of the Periodic Table.

10 Claims, 4 Drawing Figures

INVENTOR.
CHARLES P. MORSE

PATENTED MAY 21 1974 3,811,358

SHEET 2 OF 2

INVENTOR.
CHARLES P. MORSE
BY *Julian J. Schanen*
ATTORNEY

SOLID PROPELLANTS CONTAINING REINFORCING FILAMENT AND PROCESS OF MAKING

This invention relates to solid rocket motors and solid propellant grains having improved structural characteristics.

The solid rocket motors ordinarily are constructed with a heavy metal outer body in which the solid propellant grain is encased. The outer shell must be strong enough to withstand the high pressure generated during firing of the grain since the grain itself has relatively low hoop and tensile strength. Since the solid grain is ordinarily composed of an organic polymeric binder, a particulate fuel, and an oxidizer, it is incapable of withstanding the pressures generated during firing. Thus, the rocket motor contains a relatively high percentage of inerts which function only as structural elements and detract from the total performance of the rocket.

It is, therefore, an object of this invention to provide a solid rocket motor in which the solid propellant grain has improved structural characteristics and enables construction of the rocket with a minimum of inert weight. Another object of this invention is to provide a solid propellant grain having greatly improved structural characteristics. A further object of this invention is to provide a reinforced solid propellant grain. A still further object is to provide a method for obtaining such a reinforced propellant grain.

The above and other objects of this invention are accomplished by providing a rocket motor having a solid propellant grain which comprises a matrix of a solid combustable or decomposable material and a lattice of at least one substantially continuous metal reinforcing filament element embedded in the matrix to improve the strength of the matrix and function as a component of the propellant grain. The lattice is positioned in the matrix in one of several configurations, but generally the primary direction traversed by the filaments of the metal lattice is non-parallel to any plane of symmetry of the propellant grain. That is, the individual filaments in the lattice are not parallel to the direction of thrust of the rocket. Thus, the filament lattice may have the configuration of a plurality of helices traversing the grain (which may have the general configuration of a hollow cylinder) in both directions. The metal filament lattice may also be in the form of a screen having, in any one cross-section through the axis of the cylinder, the general configuration of a spiral with a portion of the wire filaments being approximately parallel to the axis of the cylinder. Alternately, the filament lattice may represent a single wire filament or a series of filaments approximately circumferentially wrapped in a series of layers throughout the matrix of the propellant grain. The grain may also have the general configuration of a hollow sphere with the filament lattice embedded in the binder matrix.

Figure 4:
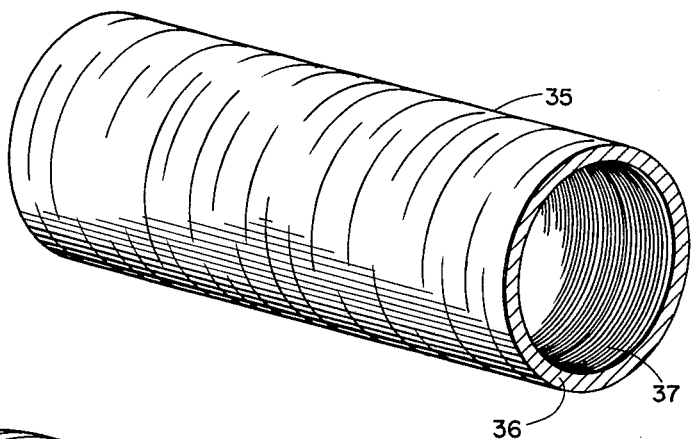
Figure 2:
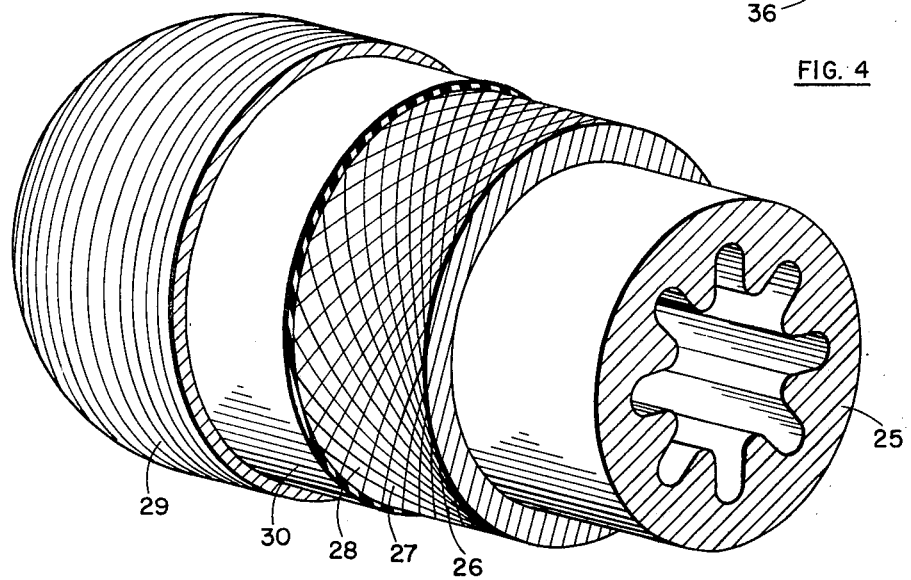
Figure 3:
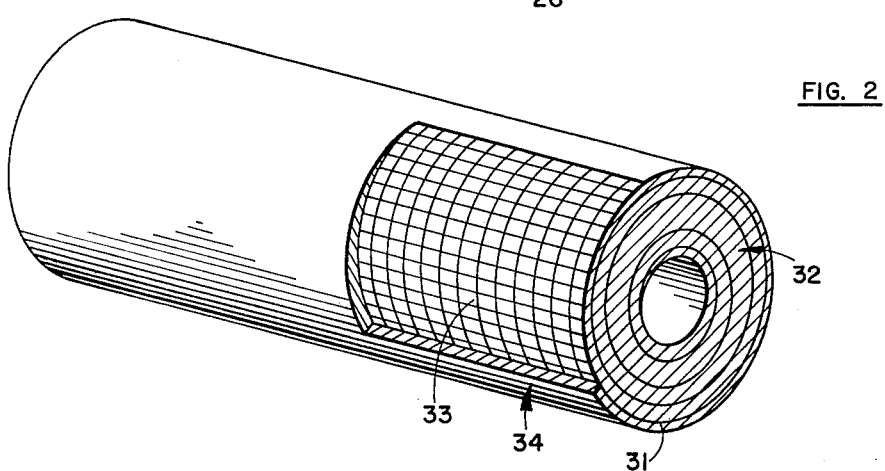

In the drawings accompanying this invention, FIG. 1 illustrates a solid propellant rocket motor embodying a propellant grain of this invention in which the filament lattice is helically wound throughout the major portion of the propellant grain; while FIG. 2 illustrates a cutaway view of a solid propellant grain having a conventional inner segment and an outer section in which a filament lattice is helically embedded in the grain matrix;

FIG. 3 illustrates an embodiment of this invention in which the solid grain is reinforced with a continuous wire mesh embedded spirally in the grain; and FIG. 4 is illustrative of a solid propellant grain of the invention in which a continuous wire filament is embedded in a hollow cylindrical matrix of propellant composition and wherein the winding is approximately circumferential around and through the propellant grain.

Referring now to the drawings, FIG. 1 illustrates a rocket motor embodying the solid propellant grain of this invention in which the reinforcing filament lattice is helically embedded throughout the propellant grain. The rocket motor consists of a casing 10 which may be a phenolic bonded glass wrap laminate. Immediately beneath the outer casing 10 is a liner 11 which may be of a relatively thin insulating material such as rubber. At the forward end of the motor is an enclosed tube 12 into which a conventional igniter for initiating burning may be inserted before fabrication. Immediately inside the liner 11 is a section of the propellant grain 13 which is composed of a decomposable polymeric matrix such as polyurethane resin, particles of an oxidizer such as ammonium perchlorate and a metallic wire filament helically wound throughout the section in a plurality of layers. The metallic filament is preferably aluminum. Immediately adjacent and inside the reinforced grain 13 is conventional solid propellant grain 14 which may have the configuration of a "star" grain. At the ends of the motor a layer of slow-burning propellant is interposed between the conventional grain 14 and the reinforced grain 13. This is shown by sections 18 at the forward end of the motor and 20 at the nozzle end. A section of the slow-burning propellant 19 immediately surrounds the tube 12 and is separated from the reinforced grain 13 by a layer of insulation 17. At the forward end a polar plate 16 is interposed between the propellant sections 19 and 13 and the outer casing 10. This polar plate 16 is to facilitate wrapping of the fiberglass shell 10 and to provide structural stability to the finished motor. At the nozzle end the reinforced grain 13 and slow-burning propellant segment 20 are protected by an insulating layer 21 which extends to the end of the nozzle 15. The nozzle 15 may be of metal and is attached to the motor by means of the polar plate 23 in any convenient fashion. The throat area 22 of the nozzle is separated from the outer portion of the nozzle by the insulating layer 21. The throat area is preferably a refractory material which is capable of absorbing large quantities of heat and may be, for example, tungsten coated graphite.

FIG. 2 is a cutaway view of a motor similar to that shown in FIG. 1. A conventional star grain is illustrated at 25, while 26 illustrates generally the reinforced grain section in which the wire strands 27 are wrapped helically throughout the polymer matrix 28. The fiberglass outer shell, bonded with a phenolic plastic, is represented by the numeral 29, while the case liner is shown at 30.

FIG. 3 illustrates a portion of a solid propellant grain according to this invention in which a wire mesh is spirally embedded in the grain 34. The wire mesh is shown at 31 embedded in the polymer and oxidizer material 32 and a cutaway portion, showing the exposed wire mesh, is illustrated at 33.

FIG. 4 illustrates a further embodiment of this invention in which a solid propellant grain 35 is prepared from a matrix 36 of binder and oxidizer and a filament lattice 37 of aluminum wire wrapped in a plurality of layers throughout the matrix in a substantially circumferential manner.

The filament lattice employed in the propellant grain of this invention is a metal or metal alloy, preferably it contains predominantly one or more of the metals of Groups I-A, II-A, III-A, and Groups I-B through VII-B, and Group VIII of the Peridoic Table. Thus, the metallic filament may contain Group I-A elements such as lithium, Group II-A metals such as beryllium or magnesium. Illustrative of the Group III-A metals is aluminum. The metals of Group I-B through VII-B include copper, silver, zinc, cadmium, titanium, zirconium, vanadium, niobium, chromium, molybdenum, tungsten, manganese, iron, cobalt, nickel, ruthenium, rhodium, osmium, palladium, and platinum.

When preparing rocket propellants of this invention metal filaments having good strength and high heats of combustion are preferred for inclusion in the polymeric matrix. It is also preferable to employ metals of relatively low molecular weight which give low molecular weight combustion products. Preferred metals for inclusion in the polymer' matrix include aluminum, beryllium, lithium, and these metals alloyed with higher strength materials where required, because of the above considerations.

The filament lattice may be a wire or a narrow metal tape, thus the cross section of the filament need not be circular, and relatively wide sections of tape or metal foil may be employed. When a metal foil is employed, it is preferred that it be perforated to allow an even distribution of the polymeric matrix and provide for even burning rate in the propellant grain.

Reinforcing wire lattice may provide from less than 5 to over 80 percent of the weight of the combined lattice and matrix in which it is embedded. From 1 to 95 percent of the weight may be the polymeric binder. The precise weight ratio of filament lattice to polymeric binder will depend upon the use to which the finished composition is put and the number and amount of other ingredients included. For example, in a typical solid propellant composition it is often desired to include less than a stoichiometric amount of oxidizer based on the amount of metal and binder present to maximize specific impulse. It is also preferred to maintain the binder at minimum weight since other ingredients tend to give a higher specific impulse. Thus, compositions containing about 10–20 percent aluminum, 60–70 percent oxidizer, and from 1–30 percent binder and other additives have been employed. This invention has the advantage of enabling the ratio of aluminum and oxidizer to be increased with respect to the binder since only enough binder need be included to cause the filament lattice to adhere. The lattice itself provides structural stability to the propellant. This structural stability formerly was a function of the strength of the polymeric binder and forced the inclusion of larger than desired concentrations of binder in the propellant and therefore lowered specific impulse.

The matrix of solid decomposable material employed in preparing the reinforced rocket solid grain of the invention may be a compacted particulate inorganic material serving as a fuel or an organic binder or a combination of these. The matrix may also contain the oxidizer employed to burn the binder and fuel in producing thrust. Inorganic materials which may serve as the matrix include the metal hydrides such as lithium hydride.

The oxidizable polymeric material employed in the preparation of the reinforced compositions of this invention can be any organic polymer whether naturally occurring or synthetically prepared. Thus, thermoplastic, thermosetting, elastomeric, polymeric, and plastic materials of any description may be employed. These materials may be either naturally occurring, modified materials occurring in nature, or synthetically prepared.

Among the thermoplastic materials which may be employed are polymers and copolymers of mono-olefinic hydrocarbon having at least two carbon atoms. Thus, the polymers and copolymers of ethylene, propylene, various butenes, pentenes, and hexenes, as well as the halogenated counterparts of these olefins may be employed in the practice of this invention. Among the thermosetting polymeric materials which may be employed are those plastics and resins which cure to a solid upon the application of heat with or without a chemical curing agent. Illustrative examples of this class of material include the polyurethane resins, epoxide resins, polyester materials, and di(thioalkoxy) methylene polymers (polysulfide polymers). In addition, elastomers, such as the natural and synthetic rubbers, may be practicably and profitably employed in the practice of this invention. The synthetic rubbers are ordinary polymers and copolymers of a diolefin (as a major constituent) with other olefin constituents and which are subject to vulcanization with sulfur subsequent to polymerization to cross-link the polymer through any remaining carbon-to-carbon double bonds. In addition to the above, organic polymers derived from naturally occurring non-elastomeric polymeric materials may be employed in the practice of this invention.

In general, carbohydrate condensation-type polymers, amino-acid condensation polymers, synthetic linear condensation polymers including the polyamides and polyesters, linear addition polymers such as hydrocarbon and vinyl-type polymers, and cross-linking polymers may be employed to prepare the products of this invention.

The condensation-type polymers are cellulose, cellulose nitrate, cellulose acetate, cellulose acetate-butyrate, ethylcellulose, and the cellulose ethers such as methyl carboxymethyl, hydroxyethyl, cyanoethyl and benzyl cellulose.

Examples of the amino-acid condensation polymers are regenerated proteins such as casein and vegetable globulins. Synthetic linear condensation polymers which may be employed in the practice of this invention include the polyamides such as nylon, and polyurethane resins, polyesters such as the alkyd and fiber-forming types, polyester and polyesteramide rubbers.

Applicable linear addition polymers include natural and vulcanized rubbers such as gutta-percha, balata, and chicle, cyclized or isomerized rubber, rubber hydrochloride, polybutadiene rubbers including GR-S and nitrile rubber, polychloroprene and its copolymers, polysulphide rubbers, polyisobutylene and the butyl rubbers, the various polyethylenes including chlorosulphonated polyethylene rubber, polytetrafluorethylene, polystyrene, polyvinylcarbazole and polyacenaphthylene, indene and coumarone-indene resins, polyvinyl acetate, polyvinyl alcohol, polyvinyl pyrrolidone, polyvinyl formal, polyvinyl acetal, and polyvinyl butyral, polyvinyl chloride, vinyl chloride-vinyl acetate copolymers, polyacrylonitrile, vinyl chloride-acrylonitrile copolymers, polyvinylidene chloride and its copolymers, polymethyl nethacrylate and related polyacrylates, ketone aldehyde polymers and polyacrylate rubbers.

Cross-linking polymers applicable to the present invention include cross-linking type polyester resins, various epoxy resins, polymerized drying oils, aniline formaldehyde resins, sulphonamide-formaldehyde resins, urea-formaldehyde resins, melamine-formaldehyde resins, and the various phenol-formaldehyde condensation resins.

Furthermore, organic polymers containing elements other than carbon, hydrogen, oxygen, and nitrogen may be employed. For example, silicon-containing polymeric materials are advantageously adapted to the practice of this invention. The silicon-containing polymers fall into two general classes; that is, those having direct silicon-to-carbon bonds (the silanes) and those having silicon-bonded to carbon through oxygen (the siloxanes). The silicon-containing materials often have a halogen in the molecule.

It is often advisable to employ plasticizers in the preparation and utilization of the polymeric and plastimeric materials employed in the invention. These plasticizers may be of the general type, inert plasticizers and explosive plasticizers. Examples of inert plasticizers include triacetin, the various phthalates such as diethyl phthalate, dibutyl phthalate, dioctyl phthalate, di-(methoxyethyl) phthalate, methyl phthalyl ethyl glycolate, ethyl phthalyl ethyl glycolate and butyl phthalyl butyl glycolate, sebacates such as dibutyl and dicotyl sebacates, adipates such as dioctyl adipate and di(3,5,-5-trimethylhexyl)adipate, glycol esters of higher fatty acids, organic phosphate esters such as tributoxyethyl phosphate, and the like. The explosive plasticizers include nitroglycerin, butane triol trinitrate, diglycol dinitrate, ethylene glycol di-nitrate, and the like.

The solid material which may be dispersed throughout the polymer matrix is usually in finely divided form having a particle size ranging from about 1–500 microns or greater in diameter. When the composition is intended as a solid propellant grain, it is often desirable to employ a combination of two or more different particle size ranges. For example, solid propellants are prepared in which the finer material comprises a fine particle size range of from 1 micron to about 75 microns and a coarse range of from about 75 to 500 microns. However, particles of any size within the range of 1–500 microns may be employed without regard to particle size. This gives desirable burning rates to the propellant. The particle size ranges may be adjusted depending upon the particular binder-fuel-oxidizer combination employed and the specific impulse desired.

The solid substances with which the polymeric materials are loaded may be inert pigments such as titanium dioxide, lead oxide, ferric oxide, carbon black, powdered metals and alloys, metal fluorides, asbestos fibers, etc.

When the solids are oxidizing agents, as is the case in propellant compositions, they can be compounds such as metal perchlorates and metal nitrates. The metal perchlorates employed as oxidizing agents or oxygen carriers in the compositions are anhydrous and have the general formula $M(ClO_4)_x$, wherein M is $NH_4$ or a metal and $x$ is the valence of M. Since the propellant composition is required to withstand high temperature storage, it is preferable that the melting point and the decomposition temperatures of the oxidizer be as high as possible. The perchlorates of the Group I-A, Group I-B, and Group II-A metals are found to have the required high temperature stability and are employed in the preparation of propellant compositions by the process of this invention. Hence, the metal perchlorates used in the preparation of the propellant compositions include lithium perchlorate, sodium perchlorate, potassium perchlorate, rubidium perchlorate, and cesium perchlorate which are the perchlorates of the metals of Group I-A of the Periodic Table of Elements; silver perchlorate which is a perchlorate of the Group I-B metal; and magnesium perchlorate, calcium perchlorate, strontium perchlorate, and barium perchlorate which are the perchlorates of the Group II-A metals. In addition to the metal perchlorates, the compound ammonium perchlorate finds extensive use in propellant compositions. Examples of the nitrates of the Group I-A, and I-B and II-B which are employed in preparing propellant compositions by the process of this invention are compounds such as lithium nitrate, sodium nitrate, potassium nitrate, magnesium nitrate, calcium nitrate, barium nitrate, strontium nitrate, etc. Ammonium nitrate is also used.

The ratio of total solids-to-polymeric binder material in a propellant falls in the range of from about 1:1 to about 9:1 with an optimum ratio of about 8.5:1.5.

Other substances which are employed in the preparation of propellants by the process of this invention include minor amounts of burning catalysts, well known in propellant compositions. These are composed of one or a mixture of two or more metal oxide powders in amounts sufficient to improve the burning rate of the composition. The amounts usually range from about 0.01 to about 3 weight percent, based on the weight of the oxidizer employed. The particle size of the powders can range from about 10 microns to about 250 microns in diameter. Non-limiting examples of metals that serve as burning catalysts are copper, vanadium, chromium, silver, molybdenum, zinconium, antimony, manganese, iron, cobalt, and nickel. Examples of metal oxide burning catalysts are ferric oxide, aluminum, copper oxide, chromic oxide, as well as the oxides of the other metals mentioned above.

Burning rate depressants and modifiers are also sometimes advantageously added to the solid propellant grain of this invention. These are generally compounds which tend to inhibit burning reaction rates or absorb heat and include specifically carbonyl chloride, oximide, nitroguanidine, guanidine nitrate, and oxalic acid.

Curing catalysts are often added in minor amounts to cure the polymer in the performance of the process of this invention. Non-limiting examples of catalysts used for this purpose are aluminum chloride, tristrimethylsilyl borate, bensoyl peroxide, and other catalysts well known in the curing of plastics, resins, polymers, and rubbers. Examples of various catalysts may be found in text books such as "Synthetic Rubber," by G. S. Whitley, pp 892–933, 1954 Ed., published by John Wiley and Sons, Inc., N.Y. The curing catalysts are added in amounts of from 0.1 to about 10 weight percent based on the weight of the polymer, resin or elastomer. The particular catalyst and amount employed depend on the state of cure desired and the nature of the polymeric material employed in the composition.

The solid reinforced propellant compositions of this invention may also be prepared from the ingredients of double base or composite-double base propellants. In general, a composite double base propellant contains nitrocellulose or a nitrocellulose substitute, an explosive plasticizer, a metal, one or more oxidizers, and may contain inert plasticizers, stabilizers, ballistic modifiers, and additional high energy materials which may, in fact, be high explosives themselves.

Among the types of nitrocellulose and nitrocellulose substitutes which may be employed are plastisols which are cellulose materials having varying degrees of nitration, fluid ball casting powder, nitroguanidine, plastisol grade nitrocellulose, 1, 3,bis(m-acetoguanidine)2-notroxypropane, and bis-trinitroethyl nitramine.

Nitroglycerine is the most common explosive plasticizer employed. However, the following may and are frequently used: triethylene glycol dinitrate; metriol trinitrate (tri methylol ethane trinitrate); diethylene glycol dinitrate; penta erythritol trinitrate; bis(2,2-dinitropropyl)acetal; 2,2-dinitropropyl-4-nitrazopentanoate; 4-nitrazopentanonitrite; 1,4, butanediol dinitrate; butylene glycol dinitrate; dioctyl azelate soluble; bis-(2,2-dinitropropyl)formal; polyglycidyl nitrate; 2,2-dinitropropyl 2,2,3,3-tetrafluoropropyl ether; 2,2-dinitropropyl methyl ether; 2,2-dinitropropyl alkyl ether; 2,2-dinitropropyl 2-hydroxyethyl ether; 2,2-dinotro 1,3-dimethyloxypropane; 2,2-dinitro-1-3-dialkyl oxypropane; 2,2-dinitropropyl nitrate; 2,2-dinitropropylene dinitrate; 2,2-dinitropropanol; 2,2-dinitro-1-3-propanediol; 3-nitrata-1,5,pentane diisocyanate; tris (difluoramino)propane; fluorodinitroethanol; tris(hydromethyl)nitromethane; bis(2-2-2-dinitrolfluoroethyl)formal; mannitol hexanitrate; potassium dinitrocyanomethade; barium dinitrocyanomethade; trinitrotriazidobenzene; 2,2-butanediol dinitrate; trimethylalkane trinitrates; and 1,3, bis(nitroguanidine) 2-nitroxypropane.

Typical insert plasticizers are fluorylnonlymethaerylate; polytritylene ether glycol; 4-nitraza-1,5-pentane diisocyanate; hexamethylene diisocyanate; octyl diphanylphosphate; trioctylphosphate; isodecyl pelargamate; blycol mono-$n$-hexyl ether; di octyl adapate; polyacrylamide; glycol polyadipate; dimethylphthate; teflon; triethylphosphate; and adiprene-L.

Oxidizers which may be employed include those oxidizer materials enumerated above, which are generally the metal and ammonium perchlorate materials. In addition, other oxidizers (also applicable to solid propellants not containing an explosive binder or explosive plasticizer) include bis(2,2,2-trinitroethyl)nitramine; hydroxylamine; nitronium perchlorate; hydrazine nitrate; nitrosyl perchlorate; hydrazine perchlorate; hydroxylamine perchlorate; hydroxylamine nitrate; bis(-trinitroethyl) carbonate; nitrosyl tetrafluorochlorate; nitrosyl perchlorate, nitroguanidine nitrate; guanidine perchlorate; guanidine nitrate; 1,2-diaminoguanidine monoperchlorate; nitrylperchlorate; tetranitromethane; diperchlorylacetylene; diperchlorylhydrazine; perchlorylfluoride; chlorine trifluoride; perchloric acid dihydrate; lithium-aluminum superoxide; trinitroethyl orthocarbonate; and hexamethylanetetramine tetraperchlorate; cyclotrimethylene-trinitramine; cyclotetramethylene-tetranitramine; and linear polymethylene-nitramine intermediate.

In conjunction with the metal filament employed both as a fuel and to reinforce the solid grain additional metal may be included in the form of metal powders and additional metal containing compounds may be employed in the particulate form. Among such metal compound constitutents are aluminum-magnesium hydride; lithium-aluminum hydride; aluminum-lithium aluminum-hydride; aluminum-hydride; aluminum-hydride etherate; aluminum-hydride dicyanoamine complex; bis(aluminumdihydride-lithiumamine); tris-(aluminum dihydride)amine and lithium hydride.

Among the stabilizers, ballistic modifiers, and double base modifiers are tributyl phosphate; lithium cyanamide; copper phthalocyanine; recorcinal; triacetin; di-$n$-propyl adipate; adiponitrile; azodicarbonimide; diazodinitrophenol; lead molybdate; lead phthalocyanine; phenylphosphonate; lead phenylsulfonate; lead thiobenzoate; lead borate; lead glyceride; lead acid phthalate; acetylacetonates of vanadium, cobalt, chromium, and copper; triethyl phosphate; stannic oxide, polyacrylamide; dialdehyde starch; and corn starch.

The reinforced solid propellant grain of the present invention may be prepared by a number of methods. In one method a wire lattice is prepared by wrapping the metal filament on a suitable mandrel core to the desired thickness and in the desired fashion. The finished wire lattice may then be impregnated in any conventional manner with the binder material containing the oxidizer and other additives. Another method for preparing the reinforced grain is by coating the wire strand used to form the lattice with the polymer and other propellant components prior to forming the wire lattice. The wire thus coated with binder, oxidizer, and other additives, is fabricated into the desired shape and the binder cured to provide the finished propellant grain. Alternatively, the metal may be included in the grain by laminating a wire screen and sheets of material containing the other propellant ingredients. The sheets of propellant material containing the wire mesh may then be wrapped around a suitable mandrel to produce a propellant grain such as is illustrated in FIG. 3.

However, a preferred method for preparing the reinforced solid grain of the present invention is by simultaneously wrapping the wire filament on a mandrel core and applying the binder and other propellant ingredients simultaneously to the core. This may be accomplished by circumferentially or helically wrapping one or more wires on the mandrel or center grain and simultaneously applying the remainder of the propellant composition preferably at the point of contact with the wire web, the metal core, or at the already fabricated portion of the reinforced grain. When the grain is fabricated from a plurality of wires simultaneously it is possible to apply the binder-oxidizer mixture to the wire warp as the warp is wound into the finished grain.

In preparing a solid propellant grain according to this invention, it is desirable that the finished rocket motor including a solid grain devote as little weight as possible to carrying inert, unused or unwanted materials for structural purposes. Thus, it is desirable that the unburnable portion of the rocket motor, including the rocket nozzle, various control elements, and the external casing of the rocket motor, be as light as possible. Ordinarily, solid rocket motors contain a rather heavy gage solid metal shell to withstand the high pressure developed during firing. Since most solid rocket motors are cast from a single propellant composition, there is very little change over the burning life of the motor, of the internal pressure against the case wall. One method of reducing the weight of the outer casing is to reduce the burning pressure in the motor with a consequent loss in rocket performance. However, proper application of the present invention enables the construction of a solid propellant grain in which the combustion chamber pressure may be reduced as a function of time. Since the propellant grain itself has a greatly increased strength, the grain itself serves as part of the structural case of the rocket motor and is able to withstand high pressures during initial burning. As the grain burns from the inside out, the pressure which it withstands at the external case constantly decreases. Thus, in order to minimize the weight and strength of the unburnable external shell of the rocket motor, provision may be made according to this invention to gradually reduce the pressure during combustion of the propellant grain. This may be accomplished in one of several ways. A burning rate catalyst or depressant may be included in the propellant composition and the concentration of catalysts may be varied as a function of distance from the central axis of the grain. In this way, the center portion of the grain may be made to burn at a more rapid rate than the outer portion, thus reducing the pressure as the grain is consumed.

Furthermore, propellant pressure decay may be provided for by varying, as a function of the distance of the center of the grain, the propellant composition and particle size of the oxidizer. Thus, if the amount of oxidizer per unit weight of binder decreases away from the center of the grain and a particle size of the oxidizer is increased in the same direction, a much lower burning pressure results.

Still another method of providing for pressure decay in the solid propellant is to employ a hybrid system in which the propellant grain is prepared with no solid oxidizer, but is supplied during combustion with oxidizer as a liquid from a tank separate from the solid grain itself. By continuously varying the rate at which oxidizer is supplied to the solid grain, pressure in the combustion chamber may easily be controlled. When prepared without an oxidizer, the propellant grain of this invention may be fabricated into a rocket motor similar to that shown in FIG. 1. However, in this instance it is necessary to provide an oxidizer tank forward of the reinforced grain containing rocket motor. This may be accomplished in many ways. For example, the tube 12 may be opened at the forward end and attached in an appropriate manner to a tank containing the oxidizer fluid. Ignition of the rocket motor may be accomplished by injecting a hypergolic material into the oxidizer stream at the initiation of operation. When employed as a hybrid system with a liquid oxidizer, a large variety of liquid oxidizer materials may be employed. Some liquid oxidizers of particularly high energy are generally cryogenic liquid; that is, they are liquids at relatively low temperatures. The liquid oxidizers include oxygen, fluorine, trifluoramine, nitrogen tetroxide, hydrogen peroxide, perchloromile fluorine, and other high energy oxidizing materials.

Still other methods may be used to control the pressure to minimize the ultimate strength needed in the propellant casing. For example, a moveable plug may be provided in the nozzle area of the rocket. Gradual withdrawal of the plug allows combustion product gases to escape at a lower pressure. A rocket may also be constructed so that the throat area of the nozzle gradually increases during combustion. This may be accomplished by building the nozzle with an inner surface coating which gradually burns or erodes away during combustion.

In applying the present invention to the preparation of solid propellant rocket engines a great many variations in engine shape and propellant grain configurations may be employed. Proper application of the reinforced propellant grain of this invention makes possible a tremendous reduction in non-combustible material usually carried along with a rocket engine as, for example, in the casing. In most solid rocket motors the outer casing must be fabricated to withstand extremely high pressures and thus contribute a great deal to the weight of the motor. Since the solid propellant of the present invention has greatly improved structural stability, it may be considered as a part of the motor casing itself. Thus, the outer casing for the rocket motor may greatly be reduced in weight by the practice of this invention. Such lightweight casings as glass filaments bonded with a minor amount of polymeric material and thin metal shells may be employed.

The following specific examples illustrate solid propellant grains of this invention.

EXAMPLE 1

A prepolymer was prepared by reacting two mols of toluene diisocyanate with one mol polypropylene glycol having a molecular weight of 2.05 and two mols of 1,4-butanodiol. 1,125 parts of this prepolymer, 3,750 parts of ammonium perchlorate and 125 parts polymer aryl polyisocyanate were then blended in a mixer. To maintain proper viscosity about 100 parts of $n$-heptane was added to the mixture. A portion of this polymer-curing agent-ammonium perchlorate mixture was spread on a 30 mesh aluminum screen wire web 12 inches wide and 32 ½ inches long in which the individual wire had a diameter of 0.013 inches. The web was then coiled into a cylinder 12 inches long and pressed in a split mold. The split mold, 12 inches long, had an internal mandrel 11/16 inches in diameter. The mold was closed and excess polymer-ammonium perchlorate mixture forced out through exit ports. The mold was then heated at 165°F for 72 hours to produce (after removal of the mandrel) a cylindrical composite having a wire screen embedded in the cured polymer matrix. The finished cylinder weighed approximately 1.84 lb. and contained 24.8 percent aluminum wire, approximately 50 percent of which consisted of a plurality of aluminum wire strands spirally wound from the center to the outside of the cylinder.

To demonstrate the improved physical properties of this reinforced polymeric cylinder, a 5 inch piece was sealed on the ends and filled with an oil and subjected to hydraulic pressure. The cylinder did not rupture until the internal pressure reached approximately 1,370 lb. per square inch gage.

In contrast to this, a polymeric cylinder prepared from the indentical prepolymer and which contained no metallic filler ruptured at about 180 lbs. per square inch gage hydraulic pressure.

EXAMPLE 2

The procedure of Example 1 was followed using a 20-mesh aluminum wire screen having a 0.015 inch wire diameter. The final cylinder of propellant contained 20.8 percent aluminum and had a rupture strength of over 800 lbs. per square inch gage.

EXAMPLE 3

Using the polymer and oxidizer mixture of Example 1, a length of 0.010 inch diameter aluminum wire was wound onto a mandrel while the oxidizer-binder mixture was simultaneously applied. The mandrel was held on a rotating chuck and the aluminum wire fed so that the center of each turn of wire was approximately 1/16 inch distance from its nearest neighbors. Successive layers of helically wound wire were applied to the mandrel so that alternate layers proceeded in opposite directions along the cylinder and such that the wires of each layer contacted those of adjacent layers. Application of wire and polymer was continued until a hollow cylinder having a wall thickness of 0.215 inches was prepared. After cure as in Example 1, the matrix contained 20 percent aluminum by weight.

EXAMPLE 4

Again following the procedure of Example 3, 0.010 inch diameter aluminum wire filament was wound into a cylinder having walls 0.52 inches thick in a matrix of the toluene-diisocyanate-polypropylene glycolbutandiol end-capped polymer containing ammonium perchlorate and polyaryl polyisocyanate as a curing agent. The finished cylinder contained about 21.4 percent aluminum. When subjected to the hydraulic burst test, the cylinder did not rupture at 2,025 psig, at which point the test was discontinued.

EXAMPLE 5

The procedure of Example 4 was repeated except that the aluminum wire strands were wound so that the centers were one-eighth inches apart. In this manner a composition of this invention is prepared having a much lower aluminum content.

EXAMPLE 6

The procedure of Example 3 is repeated using iron wire instead of aluminum. The final cylinder after cure contained a higher proportion of metal to other propellant ingredients.

Reinforced solid propellant grains of this invention are also prepared using warps of wire containing from two to 12 or more wires with equally good results. The wires may be simultaneously wrapped either helically or essentially circumferentially on a mandrel core by one of the methods described above. The relative proportions of polymeric binder, oxidizer and reinforcing filament lattice are likewise in the proportions described above.

Among the advantages of the reinforced solid propellant grain of this invention are higher specific impulses than obtainable with propellant grains having similar compositions in which the metal is not in the form of a continuous filament. For example, a conventional cast grain which contains from 15 to 18 percent polymeric binder and about 16 percent aluminum, the balance being ammonium perchlorate oxidizer, gives a maximum specific impulse of about 245 seconds. The reinforced propellant grain of this invention containing approximately 11 percent binder, 10 to 20 percent aluminum in the form of fine diameter wire filaments, the balance ammonium perchlorate yields specific impulses of 255 seconds or more. In addition, the solid propellant grain of this invention gives a higher characteristic exhaust velocity than conventional cast grains. The conventional cast grain containing 15 to 18 percent binder and 16 percent powdered aluminum, generally gives a maximum characteristic exhaust velocity of about 5,000 feet per second, while a propellant grain in accordance with the present invention yields a significant improvement in characteristic exhaust velocity. These performance benefits are in addition to the improvements mentioned above provided by the propellant grain of this invention.

I claim:

1. A propellant grain comprising a solid decomposable polymeric matrix and a reinforcing metal filament lattice supported in said matrix to improve the tensile strength thereof, said lattice comprising at least one continuous metal filament element wherein each filament traverses a direction which is not parallel to any plane of symmetry in said matrix, said lattice selected from the class consisting of metals of Group II-A through Group IV-A, Group I-B through VII-B, and Group VIII of the Periodic Table.

2. A rocket motor containing a solid propellant grain, said grain comprising a matrix of a solid decomposable organic polymeric material and a reinforcing filament lattice embedded in said matrix, said lattice comprising at least one continuous metal filament element, each of said filaments traversing a direction which is non-parallel to the direction of thrust of said rocket motor.

3. A rocket motor comprising a solid decomposable polymeric matrix having dispersed therein a solid particulate inorganic salt filling substance, and a reinforcing filament lattice supported in said matrix to improve the strength thereof, said lattice comprising at least one continuous filament element wherein each filament in said lattice traverses a direction which is not parallel to any plane of symmetry of said matrix, said lattice selected from the class consisting of metals of Group II-A through Group IV-A, Group I-B through Group VII-B, and Group VIII of the Periodic Table.

4. A rocket motor comprising (1) a matrix having the general configuration of a hollow cylinder, said matrix comprising a solid decomposable polymeric material and (2) a reinforcing filament lattice embedded in said matrix said lattice comprising at least one continuous metal filament element wherein each filament in said lattice is positioned helically within said matrix to improve the strength thereof.

5. A solid propellant grain comprising an inner matrix of a solid decomposable polymeric material and an oxidizer and an outer matrix of a solid oxidizable polymeric material, a solid inorganic salt oxidizer, and at least one continuous metallic reinforcing element positioned within said outer matrix to improve the strength of said propellant each filament in said matrix traversing a direction which is non-parallel to the center axis of the grain.

6. A process for the manufacture of a reinforced solid propellant grain having a reinforcing filament lattice, said process comprising wrapping at least one filament of reinforcing decomposable metal material on a core to form a filament lattice; applying a polymeric binding material to said lattice and curing said polymeric binder material to form a solid polymeric matrix reinforced with said filament lattice.

7. The process of claim 6, wherein said core is a removable mandrel core.

8. A process for the manufacture of a reinforced solid propellant grain comprising a decomposable organic polymeric matrix and a reinforcing filament lattice, said process comprising forming said lattice by wrapping at least one filament of reinforcing material on a core and subsequently impregnating said lattice with a curable polymeric organic composition and curing said polymeric material.

9. The propellant grain of claim 1 wherein said filament comprises from 10 to 20 weight percent of the composition.

10. The rocket motor of claim 9 wherein said filament lattice comprises from 10 to 20 weight percent of the composition.

* * * * *